US009838451B2

(12) United States Patent
Chasen et al.

(10) Patent No.: US 9,838,451 B2
(45) Date of Patent: *Dec. 5, 2017

(54) SYSTEMS AND METHODS FOR DYNAMIC ACCESS TO PROGRAM FEATURES

(71) Applicant: Intel Corporation, Santa Clara, CA (US)

(72) Inventors: Jeffrey M. Chasen, Redmond, WA (US); Joshua E. Elman, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/535,684

(22) Filed: Nov. 7, 2014

(65) Prior Publication Data

US 2015/0101067 A1 Apr. 9, 2015

Related U.S. Application Data

(63) Continuation of application No. 12/962,450, filed on Dec. 7, 2010, now Pat. No. 8,909,777, which is a continuation of application No. 10/185,526, filed on Jun. 26, 2002, now abandoned.

(51) Int. Cl.
*G06F 15/173* (2006.01)
*H04L 29/06* (2006.01)
(Continued)

(52) U.S. Cl.
CPC .............. *H04L 65/60* (2013.01); *G06F 21/10* (2013.01); *G06F 21/105* (2013.01);
(Continued)

(58) Field of Classification Search
CPC ...... G06F 21/10; G06F 21/105; G06F 21/121; G06Q 40/12; H04L 67/42
(Continued)

(56) References Cited

U.S. PATENT DOCUMENTS 4,658,093 A 4/1987 Hellman
4,888,798 A 12/1989 Earnest
(Continued)

FOREIGN PATENT DOCUMENTS

EP 0567800 A1 11/1993

OTHER PUBLICATIONS

Dgupelia-Multi-User Application Program Interface, p. 1-26, Apr. 26, 2002.*
(Continued)

*Primary Examiner* — Evans Desrosiers
(74) *Attorney, Agent, or Firm* — Christopher K. Gagne

(57) ABSTRACT

The multimedia client-server system provides a multimedia client program with a set of features and a server system that creates feature access information that determines which features are to be made available to a particular user. The server system may send the feature access information to the user such that the information is accessible to the multimedia client program. The multimedia client program may dynamically control the user's access to the program's feature set by using the feature access information to validate and verify the user. In addition, the feature access information may be accessible to the server system, such that the server system may periodically update the feature access information, such as, for example, when the user accesses the server system to download multimedia content.

12 Claims, 8 Drawing Sheets

(51) Int. Cl.
*G06F 21/10* (2013.01)
*G06Q 40/00* (2012.01)
*G06F 21/12* (2013.01)

(52) U.S. Cl.
CPC .......... *G06F 21/121* (2013.01); *G06Q 40/12* (2013.12); *H04L 63/10* (2013.01); *H04L 67/42* (2013.01); *A63F 2300/5513* (2013.01)

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 4,919,545 | A | 4/1990 | Yu |
| 5,023,907 | A | 6/1991 | Johnson |
| 5,103,476 | A | 4/1992 | Waite |
| 5,138,712 | A | 8/1992 | Corbin |
| 5,222,134 | A | 6/1993 | Waite |
| 5,235,642 | A | 8/1993 | Wobber |
| 5,319,705 | A | 6/1994 | Halter |
| 5,321,841 | A | 6/1994 | East |
| 5,375,240 | A | 12/1994 | Grundy |
| 5,400,403 | A | 3/1995 | Fahn |
| 5,629,980 | A | 5/1997 | Stefik |
| 5,790,664 | A | 8/1998 | Coley |
| 5,845,281 | A | 12/1998 | Benson |
| 5,854,891 | A | 12/1998 | Postlewaite |
| 5,862,325 | A | 1/1999 | Reed |
| 5,910,987 | A | 6/1999 | Ginter |
| 5,933,087 | A | 8/1999 | Wright |
| 5,953,005 | A | 9/1999 | Liu |
| 6,044,471 | A | 3/2000 | Colvin |
| 6,070,171 | A | 5/2000 | Snyder |
| 6,085,224 | A | 7/2000 | Wagner |
| 6,108,420 | A | 8/2000 | Larose |
| 6,199,113 | B1 | 3/2001 | Alegre |
| 6,205,480 | B1 | 3/2001 | Broadhurst |
| 6,213,391 | B1 | 4/2001 | Lewis |
| 6,233,567 | B1 | 5/2001 | Cohen |
| 6,248,946 | B1 | 6/2001 | Dwek |
| 6,249,868 | B1 | 6/2001 | Sherman |
| 6,366,907 | B1 | 4/2002 | Fanning |
| 6,374,300 | B2 | 4/2002 | Masters |
| 6,374,359 | B1 | 4/2002 | Shrader |
| 6,393,562 | B1 | 5/2002 | Maillard |
| 6,421,729 | B1 | 7/2002 | Paltenghe |
| 6,446,211 | B1 | 9/2002 | Colvin |
| 6,453,305 | B1 | 9/2002 | Glassman |
| 6,453,353 | B1 | 9/2002 | Win |
| 6,460,140 | B1 | 10/2002 | Schoch |
| 6,463,534 | B1 | 10/2002 | Geiger |
| 6,466,983 | B1 | 10/2002 | Strazza |
| 6,490,684 | B1 | 12/2002 | Fenstemaker |
| 6,539,424 | B1 | 3/2003 | Dutta |
| 6,567,107 | B1 | 5/2003 | Stannard |
| 6,594,765 | B2 | 7/2003 | Sherman |
| 6,675,205 | B2 | 1/2004 | Meadway |
| 6,694,384 | B1 | 2/2004 | Moeller |
| 6,735,627 | B2 | 5/2004 | Urien |
| 6,742,023 | B1 | 5/2004 | Fanning |
| 6,742,176 | B1 | 5/2004 | Million |
| 6,754,715 | B1 | 6/2004 | Cannon |
| 6,785,708 | B1 | 8/2004 | Busey |
| 6,802,006 | B1 | 10/2004 | Bodrov |
| 6,807,559 | B1 | 10/2004 | Budhiraja |
| 6,816,909 | B1 | 11/2004 | Chang |
| 6,829,704 | B2 | 12/2004 | Zhang |
| 6,835,131 | B1 | 12/2004 | White |
| 6,839,734 | B1 | 1/2005 | Vega-Garcia |
| 6,857,006 | B1 | 2/2005 | Nishizawa |
| 6,865,600 | B1 | 3/2005 | Brydon |
| 6,876,103 | B2 | 4/2005 | Radusewicz |
| 6,877,134 | B1 | 4/2005 | Fuller |
| 6,898,576 | B2 | 5/2005 | Stefik |
| 6,944,136 | B2 | 9/2005 | Kim |
| 6,983,375 | B2 | 1/2006 | Zhang |
| 6,993,664 | B2 | 1/2006 | Padole |
| 6,999,987 | B1 | 2/2006 | Billingsley |
| 7,010,582 | B1 | 3/2006 | Cheng |
| 7,032,000 | B2 | 4/2006 | Tripp |
| 7,032,177 | B2 | 4/2006 | Novak |
| 7,069,580 | B1 | 6/2006 | Deitz |
| 7,085,845 | B2 | 8/2006 | Woodward |
| 7,089,579 | B1 | 8/2006 | Mao |
| 7,095,871 | B2 | 8/2006 | Jones |
| 7,103,574 | B1 | 9/2006 | Peinado |
| 7,127,613 | B2 | 10/2006 | Pabla |
| 7,130,921 | B2 | 10/2006 | Goodman |
| 7,143,153 | B1 | 11/2006 | Black |
| 7,174,455 | B1 | 2/2007 | Arnold |
| 7,213,266 | B1 | 5/2007 | Maher |
| 7,233,997 | B1 | 6/2007 | Leveridge |
| 7,260,608 | B2 | 8/2007 | Kuki |
| 7,353,274 | B1 | 4/2008 | Rouhi |
| 7,483,958 | B1 | 1/2009 | Elabbady |
| 7,690,014 | B2 | 3/2010 | Sakao |
| 2001/0014883 | A1 | 8/2001 | Yamane |
| 2001/0047447 | A1* | 11/2001 | Katsuda .................. G06F 8/60 711/1 |
| 2001/0051928 | A1 | 12/2001 | Brody |
| 2002/0004785 | A1 | 1/2002 | Schull |
| 2002/0027567 | A1 | 3/2002 | Niamir |
| 2002/0060750 | A1 | 5/2002 | Istvan |
| 2002/0073204 | A1 | 6/2002 | Dutta |
| 2002/0076044 | A1 | 6/2002 | Pires |
| 2002/0078337 | A1* | 6/2002 | Moreau ................ G06F 3/1238 713/1 |
| 2002/0107806 | A1* | 8/2002 | Higashi .................. G06F 21/10 705/51 |
| 2002/0112056 | A1 | 8/2002 | Baldwin |
| 2002/0116082 | A1 | 8/2002 | Gudorf |
| 2002/0120579 | A1 | 8/2002 | Kawaguchi |
| 2002/0129151 | A1 | 9/2002 | Yuen |
| 2002/0131561 | A1 | 9/2002 | Gifford |
| 2002/0143944 | A1 | 10/2002 | Traversat |
| 2002/0152400 | A1 | 10/2002 | Zhang |
| 2002/0156870 | A1 | 10/2002 | Boroumand |
| 2002/0156917 | A1 | 10/2002 | Nye |
| 2002/0161898 | A1 | 10/2002 | Hartop |
| 2002/0161990 | A1 | 10/2002 | Zhang |
| 2002/0164025 | A1 | 11/2002 | Raiz |
| 2002/0174010 | A1 | 11/2002 | Rice |
| 2002/0178385 | A1 | 11/2002 | Dent |
| 2002/0186232 | A1 | 12/2002 | Watanabe |
| 2002/0186843 | A1 | 12/2002 | Weinstein |
| 2003/0093507 | A1 | 5/2003 | Shapiro |
| 2003/0115069 | A1 | 6/2003 | Pence |
| 2003/0120923 | A1 | 6/2003 | Gilman |
| 2003/0135745 | A1 | 7/2003 | Liu |
| 2003/0149738 | A1 | 8/2003 | Jacobs |
| 2003/0212710 | A1 | 11/2003 | Guy |
| 2003/0212804 | A1 | 11/2003 | Hashemi |
| 2003/0217011 | A1 | 11/2003 | Peinado |
| 2003/0231102 | A1 | 12/2003 | Fisher |
| 2004/0003079 | A1 | 1/2004 | Aiu |
| 2004/0015962 | A1 | 1/2004 | Carbone |
| 2004/0030537 | A1 | 2/2004 | Barnard |
| 2004/0044757 | A1 | 3/2004 | Baker |
| 2004/0089346 | A1 | 5/2004 | Sutardja |
| 2004/0210765 | A1 | 10/2004 | Erickson |
| 2005/0240295 | A1 | 10/2005 | Vicauskas |
| 2015/0113051 | A1 | 4/2015 | Chasen |

OTHER PUBLICATIONS

Dhupelia (U.S. Appl. No. 60/376,115).*
Shekhar V. Dhupelia et al., "Multi-User Application Program Interface," U.S. Appl. No. 60/376,115, filed Apr. 26, 2002 (26 pages).
Limewire 4.9 User Manual, 2000-2006 (24 pages).
Smart Computing, "How to . . . Use Aimster," Apr. 2001 (5 pages).

(56) References Cited

OTHER PUBLICATIONS

CNN "After Napster: Boys Will Be File-Swappers," Oct. 2001 (2 pages).
Randall, "Power to the People," PC Magazine, Apr. 17, 2001 (3 pages).
"How Napster Works," http://www.howstuffworks.com/napster.htm/printable, printed from website Dec. 18, 2001 (5 pages).
"Question of the day: What is Aimster?", http://www.howstuffworks.com/question587.htm, printed from website Dec. 18, 2001 (2 pages).
"Windows NetMeeting Features," http://www.microsoft.com/windows/NetMeeting/Features/default.ASP, printed from website Dec. 19, 2001 (2 pages).
"Windows NetMeeting Home Users," http://www.microsoft.com/windows/NetMeeting/Home/default.ASP, printed from website Dec. 19, 2001 (1 page).
"Windows NetMeeting Send a File," http://www.microsoft.com/windows/NetMeeting/HomeFileShare/default.ASP, printed from website Dec. 19, 2001 (1 page).
Gowan, "Hungry for Music? A look at Napster alternatives," CNN, May 4, 2001 (6 pages).
"Undernet IRC FAQ (Part I) (updated Jun. 1, 1996)," http://www.user-com.undernet.org/documents/unetfaq1.html, printed from website Aug. 14, 2006 (24 pages).
ICS Department of Information & Computing Sciences, "IRC Undernet Frequently Asked Questions (FAQ) (Part 1 of 2)," http://www.cs.uu.nl/wais/html/na-dir/undernet-faq/part1.html, printed from website Jul. 26, 2006 (26 pages).
Houghton, "PIRCH 1.0 FAQ," version 1.0L2, Nov. 7, 1998 (19 pages).
"Overview of Napster, Description of Napster," http://www.oldversion.com/program.php?n=napster, printed from website Mar. 25, 2008 (3 pages).
"Napster for Windows: Manual, Transfers", http://web.archive.org/web/20011202071039/www.napster.com/help/win/manual/transfer . . . , printed from website Mar. 25, 2008 (3 pages).
"Napster for Windows: Manual, Chat and Instant Messaging," http://web.archive.org/web/20011120190515/www.napstercom/help/win/manual/chat_im . . . , printed from website Mar. 25, 2008 (7 pages).
Tyson, "How the Old Napster Worked," http://computer.howstuffworks.com/napsterhtm/printable, printed from website Mar. 24, 2008 (6 pages).
Office Action dated Aug. 19, 2005 in U.S. Appl. No. 10/185,526.
Office Action dated Dec. 20, 2005 in U.S. Appl. No. 10/185,526.
Office Action dated Jun. 1, 2006 in U.S. Appl. No. 10/185,526.
Office Action dated Jan. 2, 2007 in U.S. Appl. No. 10/185,526.
Office Action dated Jun. 20, 2007 in U.S. Appl. No. 10/185,526.
Office Action dated Feb. 8, 2008 in U.S. Appl. No. 10/185,526.
Office Action dated Nov. 17, 2008 in U.S. Appl. No. 10/185,526.
Office Action dated Jun. 3, 2009 in U.S. Appl. No. 10/185,526.
Office Action dated Nov. 20, 2009 in U.S. Appl. No. 10/185,526.
Office Action dated Apr. 7, 2010 in U.S. Appl. No. 10/185,526.
Office Action dated Jun. 6, 2005 in U.S. Appl. No. 10/143,695.
Office Action dated Nov. 16, 2005 in U.S. Appl. No. 10/143,695.
Office Action dated Aug. 16, 2006 in U.S. Appl. No. 10/143,695.
Office Action dated Feb. 26, 2007 in U.S. Appl. No. 10/143,695.
Office Action dated Aug. 14, 2007 in U.S. Appl. No. 10/143,695.
Office Action dated Apr. 3, 2008 in U.S. Appl. No. 10/143,695.
Office Action dated Dec. 16, 2008 in U.S. Appl. No. 10/143,695.
Office Action dated May 12, 2009 in U.S. Appl. No. 10/143,695.
Office Action dated Oct. 26, 2009 in U.S. Appl. No. 10/143,695.
Office Action dated Feb. 16, 2010 in U.S. Appl. No. 10/143,695.
Office Action dated Aug. 2, 2010 in U.S. Appl. No. 10/143,695.
Notice of Allowance and related attachments dated Aug. 22, 2014 in U.S. Appl. No. 12/962,450.
Advisory Action dated Aug. 7, 2014 in U.S. Appl. No. 12/962,450.
Office Action and related attachments dated May 9, 2014 in U.S. Appl. No. 12/962,450.
Office Action and related attachments dated Jan. 27, 2014 in U.S. Appl. No. 12/962,450.
Office Action and related attachments dated Aug. 15, 2013 in U.S. Appl. No. 12/962,450.
Office Action and related attachments dated May 10, 2013 in U.S. Appl. No. 12/962,450.
Advisory Action dated Oct. 30, 2012 in U.S. Appl. No. 12/962,450.
Office Action dated Aug. 20, 2012 in U.S. Appl. No. 12/962,450.
Office Action and related attachments dated May 10, 2012 in U.S. Appl. No. 12/962,450.
Office Action and related attachments dated Feb. 1, 2016 in U.S. Appl. No. 14/535,684.
Office Action and related attachments dated Feb. 1, 2016 in U.S. Appl. No. 14/574,163.
Dhupelia, U.S. Appl. No. 60/376,115, filed Apr. 26, 2002 (26 pages).
Office Action dated Aug. 1, 2016 in U.S. Appl. No. 14/535,684, and related attachments (35 pages).
Office Action dated Aug. 5, 2016 in U.S. Appl. No. 14/574,163, and related attachments (37 pages).
Office Action dated May 11, 2017 in U.S. Appl. No. 14/535,684, and related attachments.
Office Action dated May 11, 2017 in U.S. Appl. No. 14/574,163, and related attachments.
Office Action dated Jun. 6, 2017 in U.S. Appl. No. 14/579,759, and related attachments.

* cited by examiner

```
# Multimedia Client Program Cookie File
http://www.netscape.com/newsref/std/cookie_spec.html .clientprogram.com      TRUE  /  FALSE    1072046052  Features
        Cookie_Version=1.0&
        Feature_A=1|20020305|5&
        Feature_B=0|0|0&
        Feature_C=1|20020125|10&
        Feature_D=1|20020531|3&
        Feature_E=0|0|0

.clientprogram.com      TRUE  /  FALSE    1040560921  Client_Program
        Cookie_Version%2.0&
        Encrypted_Email_Address%305BA7523B23DA3DF5182F2837293857290&
        User_ID%45968015&
        Service_Names%Gold_Level&
        Service_Name_Status%Active&
        Service_Name_Expiration_Date%20020526&
        Service_Item%Content_A|Content_F|Content_P&
        Service_Item_Expiration_Date%20021117|20021117|20021117&
        Language_Code%English&
        Postal_Code%97303&
        Country_Code%USA&
        Cookie_Stale_Date%20020228&
        Reauthenticate_Date%20020315&
        Birth_Year%86&
        Gender%M&
        Hash_Value%M38XX
```

FIGURE 8

SYSTEMS AND METHODS FOR DYNAMIC ACCESS TO PROGRAM FEATURES

FIELD OF THE INVENTION

The systems and methods of the present invention relate generally to the control of program features in multimedia client-server systems. In particular, the systems and methods relate to the dynamic access of features in multimedia client programs.

BACKGROUND

To control user access to client software programs, it is common for software vendors to require that users obtain licenses before using the client software programs. To obtain a license, the user typically submits information to the software vendor via the software vendor's server. This information may include the user's email address, contact information, and payment information. The software vendor then stores the user's information in a database typically located on its server. The user must then maintain contact with the software vendor's server in order to run the client software program.

A common problem with conventional approaches is that the user information that designates whether the user should have access to the client software program is typically stored in a database on the server as noted above. In order for the user to access the client software program, the client software program sends a request to the server to verify whether the user should be allowed access to the program. Thus, every time the user attempts to access the client software program, the client software program must send a request to the server and wait for a response. As the number of users increases, the server becomes inundated with database requests causing significant delay and decreased performance.

In other conventional approaches, requests to the server database is limited by storing user information in a license file which is stored on the user's computer. In such approaches, the license file is cloaked with multiple levels of security protection to avoid any compromising of the license file. While such techniques limit access to the file, they also require the client software program to go through extensive levels of security to even read the file thereby delaying user access to the client software program.

An additional problem with the use of license files it that such files typically include a pre-determined expiration time. Thus, when the license file expires, the user is required to re-initiate contact with the server to "renew" his or her rights and to obtain a new license file.

SUMMARY OF THE INVENTION

In one aspect of the invention, the multimedia client-server system provides a multimedia client program with a set of features and a server system that creates feature access information that determines which features are to be made available to a particular user. The server system may advantageously send the feature access information to the user. The multimedia client program may then dynamically control the user's access to the program's feature set by using the feature access information to validate the user. In addition, the feature access information may advantageously be accessible to the server system, such that the server system may periodically update the feature access information, such as, for example, when the user accesses the server system to download multimedia content.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 8 illustrates a sample set of feature access information.

DETAILED DESCRIPTION OF PREFERRED EMBODIMENTS

Figure 1:
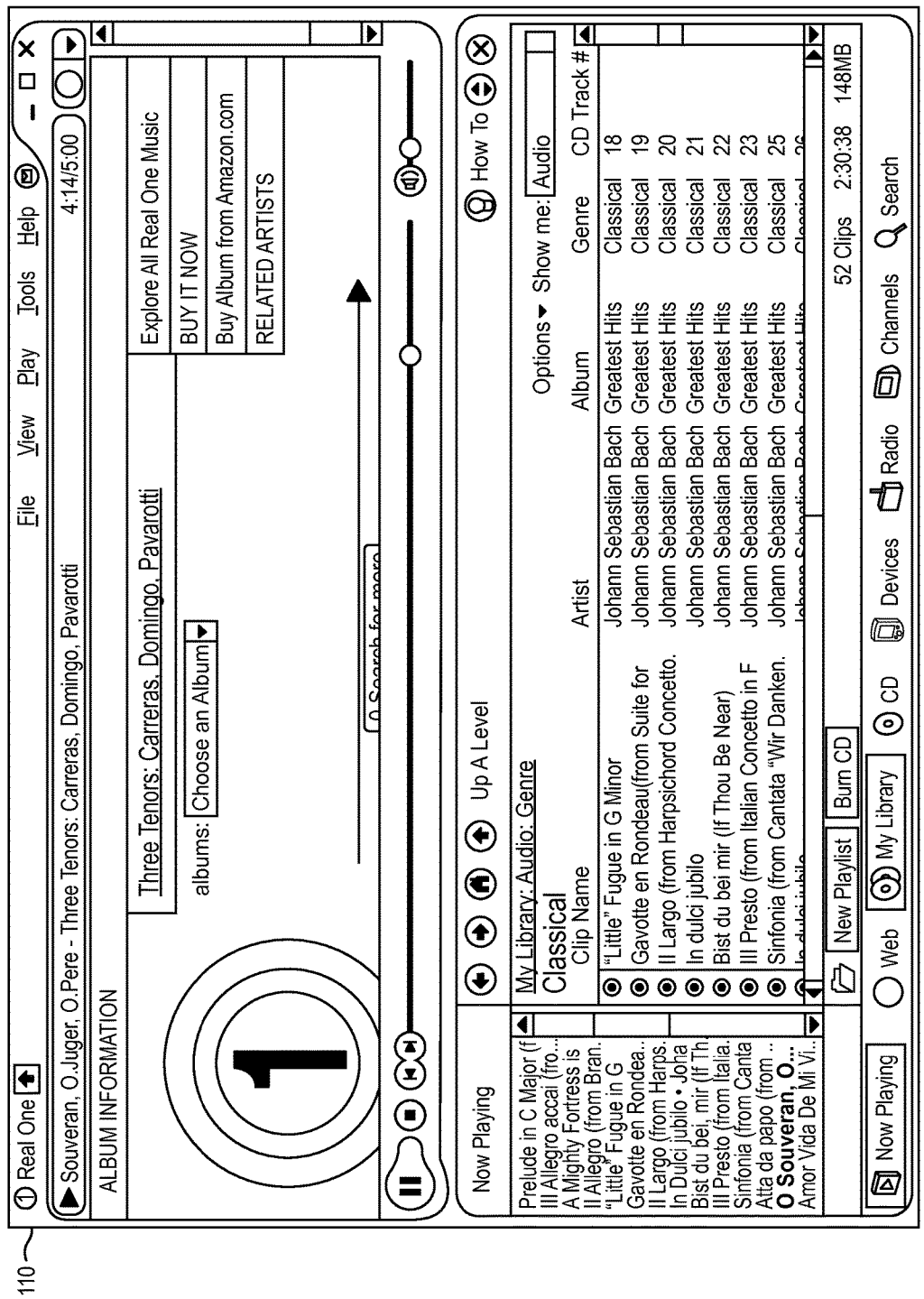
FIG. 1 illustrates a sample interface of a multimedia client program with dynamically accessible features.

Systems and methods which represent embodiments and example applications of the invention will now be described with reference to the drawings. Variations to the systems and methods which represent other embodiments will also be described. In one disclosed embodiment, the system and method are used to provide dynamic access to client features of a multimedia client program; however, the present invention is not limited by the type of client program used. Other types of client programs may be used such as, for example, a word processor that has additional features such as fax or letter templates that the user may receive as part of a subscription, or a tax preparation program where electronic filing is a feature the user may receive as part of a subscription. The figures and descriptions, however, relate to embodiments of the invention wherein the client program is a multimedia program. It is also recognized that in other embodiments, the systems and methods may be implemented as a single module and/or implemented in conjunction with a variety of other modules and the like.

The features of the systems and methods will now be described with reference to the drawings summarized above. Throughout the drawings, reference numbers are re-used to indicate correspondence between referenced elements. In addition, the first digit of each reference number indicates the figure in which the element first appears. The drawings, associated descriptions, and specific implementation are provided to illustrate embodiments of the invention, and not to limit the scope of the invention. The scope of the invention is defined by the appended claims.

I. Overview

The client-server system may advantageously provide a client program with a set of features and a server system that creates feature access information that determines which features are to be made available to a particular user. The server system may advantageously send the feature access information to the user such that the information is accessible to the client program. The client program may dynamically control the user's access to the program's feature set by using the feature access information to validate the user. In addition, the feature access information may be advantageously accessible to the server system, such that the server system may periodically update the feature access information, such as, for example, when the user accesses the server system to download multimedia content or view the server's web site.

In one embodiment, the feature access information is stored in cookies on the user's computer. Cookies are typically used to store client information and to identify the user to a server. Information on how cookies are sent to the user's computer and format in which they are stored are discussed in the specification for Cookies located at http://www.netscape.com/newsref/std/cookie_spec.html, which is hereby incorporated by reference in its entirety. In this embodiment, however, the cookies are used to store client account information from the server on the client side. Thus, whenever the user runs the client program or attempts to access a feature, the client has a copy of the relevant client account information and does not have to always contact the server. Furthermore, whenever the user accesses the server, such as, for example, to download media content, the cookies are automatically transmitted to the server permitting the server to update the client account information and to return the updated information to the client. Thus, the server is able to transparently change feature access without requiring interaction by the user. Alternatively, the user may initiate an update of the user's cookies by changing membership status or by logging onto the server to update the user's account.

One benefit of this embodiment is that requests to the server's database are reduced. User account information is stored locally on the user's computer and periodically updated by the server.

An additional benefit of this embodiment is that the client program may advantageously determine feature access dynamically using the feature access information stored on the client side. If the feature access information changes or if a feature has expired, the client program may regulate the user's access to the feature accordingly.

A further benefit of this embodiment is that the feature access information may not be "hard coded" into the client program enabling the server to enable and disable features at any time. Thus, the server may periodically update the feature access information depending on factors such as, for example, the user's account status, the subscription or license package selected by the user, or program promotion.

II. Sample Client Program and Sample Features

As noted above, in some embodiments, the client program is a multimedia client program, though it is recognized that a variety of client programs may be used. The multimedia client program may be any program and/or application that may be used to record and play audio files in a variety of formats, to record and view video and image data, to retrieve and send web documents, and so forth. For example, the multimedia client program may be an audio player, a video player, a web browser, a flash media player, a streaming video player, a streaming audio player, a game application, and so forth as well as any combination of the above.

FIG. 1 illustrates an example interface 110 of a multimedia client program. The example multimedia client program interface 110 includes a variety of features that may be enabled for use by the user. The sample multimedia client program interface 110 includes features, such as Crossfade, Record Microphone/Line in, Print CD Jewel Case, Print Music Library/Playlists, Manual Transcoding, Graphic Equalizer, Video Controls, Theater Mode, Toolbar Mode, Hi Bit Rate MP3 Encoding, and so forth. While these features are not displayed on the sample interface 110, they may be accessed via the menus and standard interface objects of the multimedia client program.

The Crossfade feature may permit a user to fade one audio clip into the next when playing a series of clips thereby creating a more professional sound. When turned on, the volume of each audio clip will start to fade out as it nears its end, and the volume of the next clip will fade in as it starts. The two clips can also overlap so that the next clip will be fading in even as the previous clip is fading out.

The Record Microphone/Line In feature may permit a user to record analog signals from various sources, such as the "Line In" connector on the user computer's sound card or the microphone connected to the user's computer.

The Print CD Jewel Case feature may permit a user to print CD jewel cases with graphics and song lists that correspond to the user's music collection.

The Print Music Library/Playlists feature may permit a user to print playlists, tracks, and albums from the user's media library to help the user keep track of the user's music collection.

The Manual Transcoding feature may permit a user to change the file format of the user's songs. For example, the user may change an audio file from MP3 format to RealAudio format.

The Graphic Equalizer feature may permit a user to customize the frequency response of the audio output. Slider controls are provided to adjust the signal gain for a specific frequency range and to control overall output volume and special effects such as Reverb.

The Video Controls feature may permit a user to adjust video clips or a clip's components without having to change the look of the user's desktop. Video clip components may include contrast, which alters the degree of difference between the light and dark shades in the clip, brightness, which adjusts how light the picture appears overall, color level, which adjusts the color saturation of the picture, that is the brilliance of the colors, tint, which adjust the overall hue of the picture, and sharpness, which adjusts the clarity of the edges in the picture.

The Theater Mode feature may permit the user to view and listen to a multimedia clip in theater mode eliminating clutter on the screen and turning the user's computer screen into a desktop theater.

The Toolbar Mode feature may permit the user to adjust the player controls. The player controls are displayed as a Toolbar at the bottom of the user's computer screen.

The Hi Bit Rate MP3 Encoding feature may permit the user to create high bit rate MP3 files. Thus, when media files are converted, the best comparable bit rate is used such that the quality of the new files are very close to the quality of the original files.

It is recognized that FIG. 1 illustrates one sample multimedia client program interface 110 and that other multimedia client programs or interfaces may be used. Furthermore, the multimedia client program interface 110 may include a variety of features, and those features discussed above are meant only to illustrate sample features. In other embodiments, the multimedia client program interface 100 may provide access to features, such as, for example, fast forward, rewind, slow speed, fast speed, 3-D graphics, color, and so forth.

It is also recognized that feature information includes a wide variety of information including information about the features of the client program as well as information about the user, the user's activity with respect to the client program, and the user's subscription and/or permission information regarding the client program. The feature information may also include information about the user computer and the servers. In addition, the feature information may include information about feature access settings, such as information about the features, whether a specific user has access to the features, how long the user has access to the features, limitations on the user's access to the features, and so forth. The feature information may be stored in a variety of formats such as, for example, text, as database records, embedded codes within the system, and so forth. Furthermore, different parts of the feature information may be stored in different locations and in different formats.

III. The System

A. Multimedia Client-Server System

Figure 2:
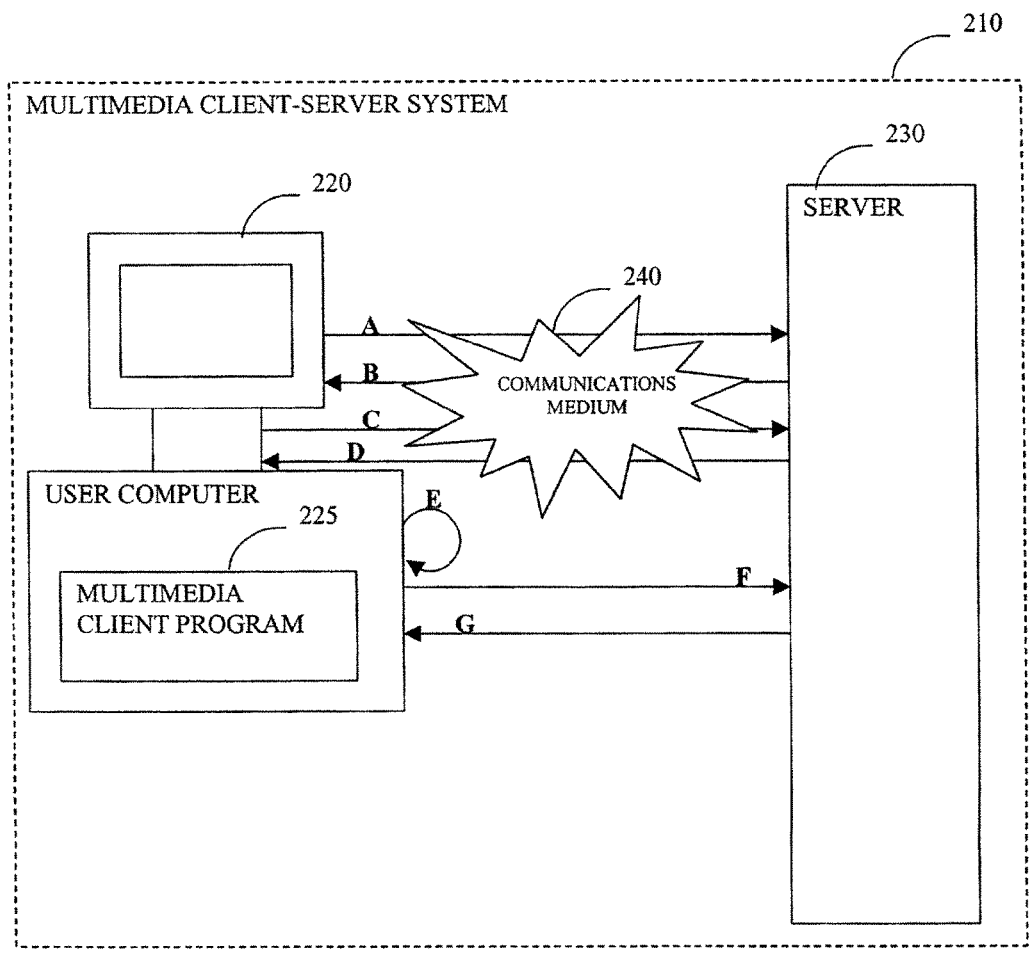
FIG. 2 illustrates a high-level block diagram of one embodiment of a multimedia client-server system that illustrates a sample flow of data among the components.

FIG. 2 illustrates one embodiment of a multimedia client-server system 210 which includes a user computer 220 that communicates with a remote server system ("server") 230 via a communications medium 240 enabling a user access to a multimedia client program 225. FIG. 2 also illustrates a sample flow of information between the user computer 220 and the server 230. In event A, a user utilizes the user computer 220 to create an account with the server 230 and the user downloads the multimedia client program 225 as shown as event B. In event C, the user selects features of the multimedia client program 225 that he or she would like enabled and sends the information to the server 230. The user may select features explicitly, such as, for example, by marking checkboxes indicating the features the user would like enabled, or implicitly, such as, for example, by signing up for a subscription or license package that includes a subset of the available features. In event D, the server 230 sends to the user computer 220 feature access information that designates the features to which the user has access. In event E, the user runs the multimedia client program 225, and the multimedia client program 225 dynamically determines which features should be enabled for the user based on the feature access information. The multimedia client program 225 does not have to contact the server each time the user attempts to access a feature. Periodically, the user computer 220 sends the feature access information to the server 230 to be updated as in event F. The server 230 updates the feature access information and returns the updated feature access information to the user computer 220 as shown in event G.

In one embodiment, the multimedia client-server system 210 may advantageously enable dynamic determination of whether a user should have access to features of the multimedia client program 225. When making dynamic determinations, the multimedia client-server system 210 may then determine in real-time whether the user has access to a feature. Thus, if the user's access has expired or been renewed since the last time the user attempted to access the feature, the multimedia client-server system 210 is able to more accurately determine user access.

In one embodiment, the multimedia client program 225 communicates with the remote server 230 using the standard HyperText Markup Language ("HTML") protocol. HTML is an authoring language used to create documents on the World Wide Web using a variety of tags and attributes. For more information on HTML, please refer to "HTML & XHTML: The Definitive Guide," by Chuck Musciano and Bill Kenney, published by O'Reilly & Associates, which is hereby incorporated by reference in its entirety.

It is recognized that the multimedia client-server system 210 may include other servers, such as content servers and/or streaming servers, and/or the exemplary server 230 may also perform content serving tasks, such as, for example, streaming and downloading of data in addition to its user information management tasks.

In one embodiment, the multimedia client-server system 210 provides a system for accessing multimedia content, such as, for example, downloading and/or streaming audio, graphic, and/or video data. In addition, the multimedia client-server system 210 may work in conjunction with a digital rights management system that provides security to protect the content data.

B. User Computer

Figure 3:
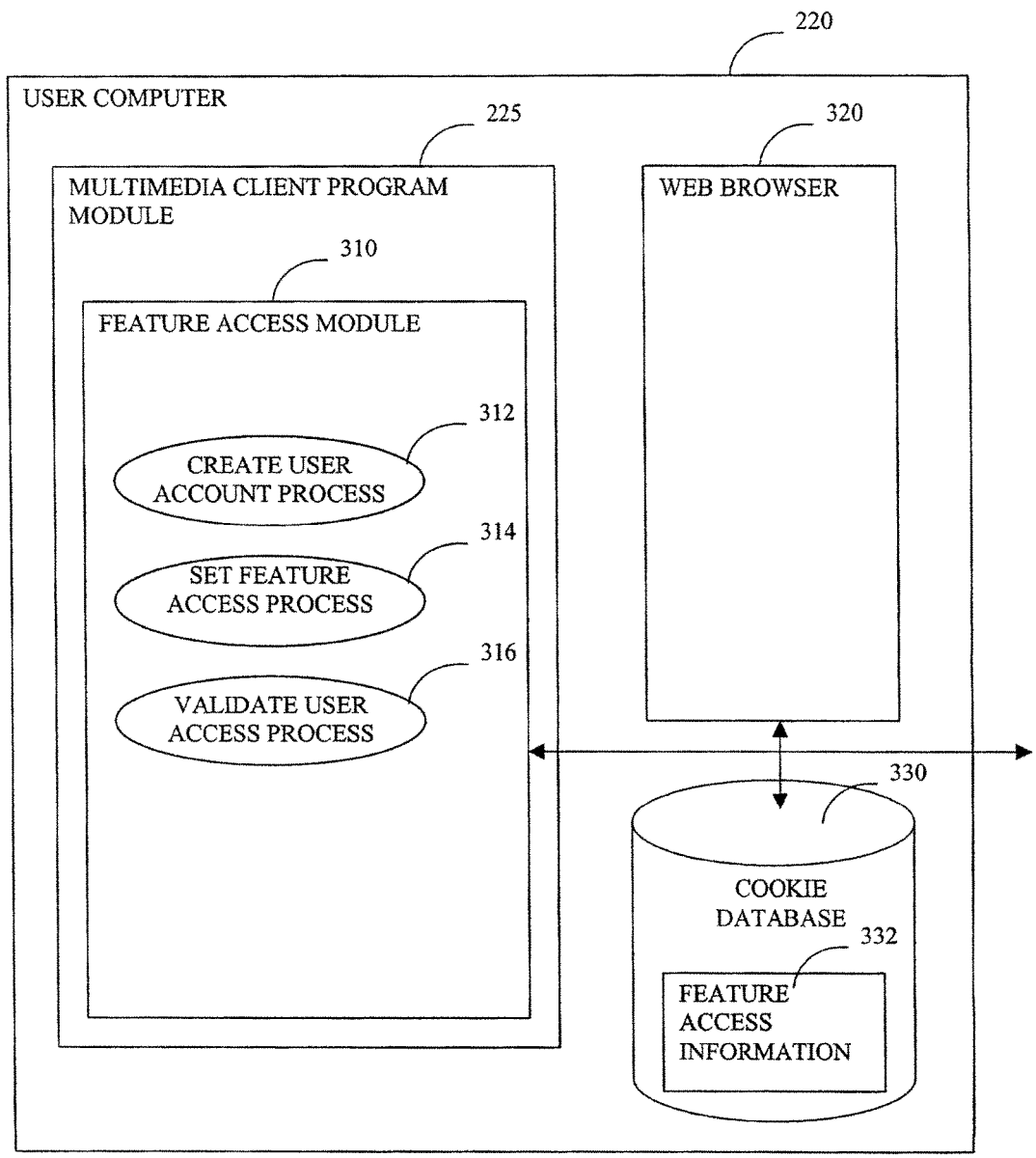
FIG. 3 illustrates a high-level block diagram of one embodiment of a user computer.

FIG. 3 illustrates one embodiment of the user computer 220 illustrated in FIG. 2. The exemplary user computer 220 includes the multimedia client program module 225 shown in FIG. 2 as well as a web browser 320 and a cookie database 330.

As used herein, the word module, whether in upper or lower case letters, refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

1. Multimedia Client Program Module

The multimedia client program module ("multimedia client program") 225 may permit a user access to a variety of multimedia content. The multimedia content may include, for example, audio data (e.g., analog audio, MP3 files, WAV files, Compact Disks, radio stations, etc.), video data (e.g., DVD, MPEG-4, etc.), image data (e.g., TIFF files, GIF files, REG files, etc.), web data (e.g., HTML pages, Java-based web pages, etc.), SMIL content data, streaming flash data, Video Compact Disc data, as well as other types of multimedia data. The multimedia content may be stored on the user computer 220 in a content database (not shown) and/or in a remote location, such as, for example, in a remote database or on a streaming server.

In one embodiment, the multimedia client program 225 includes an audio player, a video player, a digital music/video jukebox, and a built-in media browser (not shown). In addition, the multimedia client program 225 provides users with access to a network of multimedia programming such as radio stations, software games, information on current events, sports, entertainment, news, and so forth. The multimedia client program 225 also includes a set of features that may be enabled or disabled.

The exemplary multimedia client program 225 includes a feature access module 310 which manages access to the set of features of the multimedia client program 225. As in the example discussed above, the multimedia client program 225 may include features, such as, for example, Crossfade, Record Microphone/Line in, Print CD Jewel Case, Print Music Library/Play lists, Manual Transcoding, Graphic Equalizer, Video Controls, Theater Mode, Toolbar Mode, Hi Bit Rate MP3 Encoding, and so forth. When the user attempts to turn on and/or access one of the features, the feature access module 310 retrieves feature access information stored in the cookie database 330, reviews the feature access information related to the selected feature, and dynamically determines, from the feature access information, whether the user should have access to the selected feature. This determination may be based upon the information stored in the cookie, such as, for example, whether the feature is enabled, the expiration date of the feature with respect to the current date, and so forth. Furthermore, when the server 230 updates the user's feature access information, the feature access module 310 stores the information in the cookie database 330 and conducts anti-tampering procedures to help prevent the information from being modified by an unauthorized party.

The exemplary feature access module 310 also includes a create user account process 312, a set feature access process 314, and a validate user access process 316. These processes are discussed in more detail below in the section entitled "Multimedia Client-Server System Processes—User Computer Processes."

2. Web Browser

The exemplary web browser 320 is a software program that permits a user to access various web servers, including content providers, through the communications medium 240. In one embodiment, the web browser 320 is the Netscape® Navigator developed by Netscape, Inc. or the Microsoft® Internet Explorer developed by Microsoft Corporation. One of ordinary skill in the art will recognize, however, that numerous other types of access software may also be used to implement the web browser 320, such as, for example, other types of Internet browsers, customer network browsers, two-way communications software, cable modem software, point-to-point software, and the like. Furthermore, in other embodiments, the user computer 220 may include different components that enable the user to access the servers 230.

3. Cookie Database

The exemplary cookie database 330 is a collection of cookie files stored on the user computer 220 including a cookie file of feature access information 332. The cookie files contain small pieces of information, such as user name and preferences, which a server can store with a web browser or other program and later read back from that browser or program. This is useful for having the web browser 320 remember specific information from various pages. For example, when user downloads a program from a web site, the program name, type, and version may be stored in a cookie file associated with the web browser 320 so that the web browser 320 knows information about the downloaded program and can provide such information to remote servers. The feature access information is discussed in more detail below.

In connection with the cookie database 330, there may be several processes (not shown) such as ID generators, number generators, statistic generators, session generators, and temporary storage units that work with the database. Furthermore, it is recognized that the database may be implemented using a variety of different databases in addition to or instead of the cookie database 330, such as relational databases, flat file databases, and/or object-oriented databases. Moreover, it is recognized that in other embodiments, the database may be implemented as two or more databases and may include other databases. In addition, the database may be implemented as other data structures that are well know in the art such as linked lists, stacks, binary trees, and so forth.

4. System Information

In one embodiment, the user computer 220 enables the user to communicate with the server 230 via the communications medium 240. The user computer 220 may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth.

In one embodiment, the processor unit runs the Microsoft® Windows® XP operating system and performs standard operating system functions. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

In one embodiment, the user computer 220 is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the user computer 220 may be configured to support a variety of network protocols such as, for example NFS v2/v3 over UDP/TCP, Microsoft® CIFS, HTTP 1.0, HTTP 1.1, DAFS, FTP, and so forth.

C. Server

Figure 4:
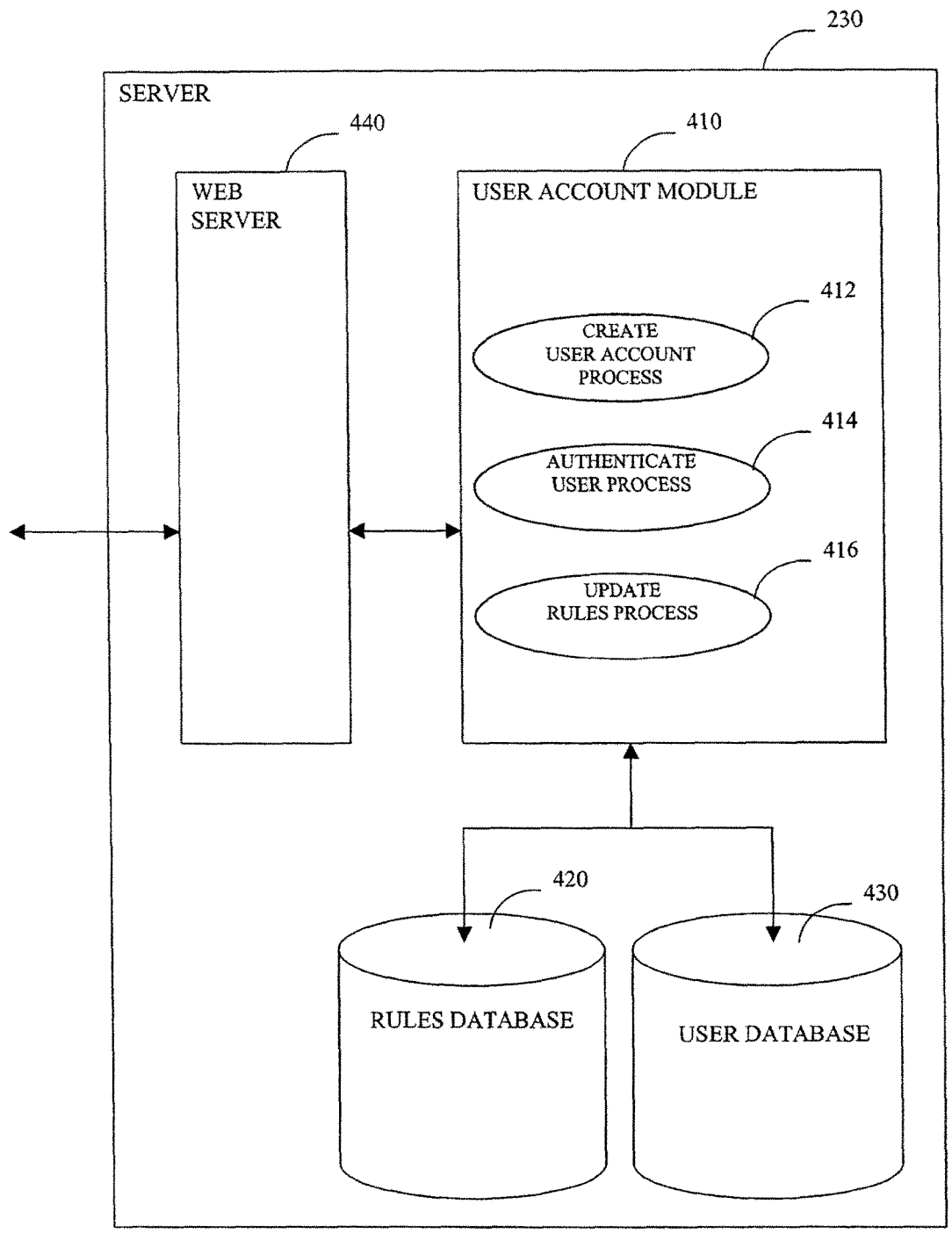
FIG. 4 illustrates a high-level block diagram of one embodiment of a server.

FIG. 4 illustrates one embodiment of the server 230 illustrated in FIG. 2. The exemplary server 230 includes a user account module 410, a rules database 420, a user database 430, and a web server 440.

1. User Account Module

The user account module 410 manages the user accounts on the server 230 interacting with the rules database 420 and the user database 430. The user account module 410 creates user accounts and determines whether the account is valid (e.g., the user's credit card payment has cleared, the user's feature access information is accurate, etc.).

The exemplary user account module 410 includes a create user account process 412, an authenticate user process 414, and an update rules process 416. These processes are discussed in more detail below in the section entitled "Multimedia Client-Server System Processes—Server Processes." The user account module may also include other processes (not shown) such as an update user account process which changes the existing user account information.

2. Rules Database

The rules database 420 tracks and manages rules enabling feature access based upon criteria, such as, the user's current license model or subscription package, the user's historical license or subscription model, current promotions, license or subscription programs, upcoming promotions, as well as any other information that may be used to promote the multimedia client program 225. For example, one rule may be that any user who signed up for the Gold Level subscription package may have access to all features of the multimedia client program 225. Another rule may be that for two weeks after a new version release of the multimedia client program 225, all users who download the new version release can have access to all features for fourteen (14) days. An additional rule may be that any user that downloaded over 100 MP3 files in the past 30 days can have access to the High Bit Rate MP3 encoding feature. It is recognized that these rules are meant as samples only and that a variety of rules may be stored in the rules database 420.

The rules database 420 enables the server 230 to control and change the rules as to whether users should be given access to particular features of the multimedia client program 225.

3. User Database

The user database 430 stores information about users of the multimedia client program 225. This information, which may be referred to as a "user profile," includes information such as, for example, the user's first name, login/password, zip/postal code, gender, age, e-mail address, and payment information, as well as other user identification information. In addition, the information may also include the features for which the users has chosen to enable access as well as features that have been automatically enabled for the user. The information may also include data on the license model or subscription package that the user has purchased indicating what type of content the user may access (e.g., specific artists, specific categories of contents, etc.), as well as the format in which the user may access the content (e.g., streaming, download, etc.). It is recognized, however, that the user database 430 may store a variety of user information.

In connection with the user database 430 and the rules database 420, there may be several processes (not shown) such as ID generators, number generators, statistic generators, session generators, and temporary storage units that work with the databases. Furthermore, it is recognized that the databases may be implemented using a variety of different databases such as relational databases, flat file databases, and/or object-oriented databases. Moreover, while the databases depicted in FIG. 4 are comprised of two separate databases, it is recognized that in other embodiments, the databases may be implemented as a single database and/or one or both of the databases may include other databases. In addition, one or both of the databases may be implemented as other data structures that are well know in the art such as linked lists, stacks, binary trees, and so forth.

4. Web Server

In one embodiment, the server 230 includes a web server 440 used to communicate with the user computer 220 via the communications medium 240. The web server 440 may interact with a database of web documents (not shown) that are sent to the web browser 320 on the user computer 220. The web documents may include standard HTML documents as well as other types of documents and may be formatted to include and/or transport cookie information. The web server 440 may process requests for the documents, review the documents, and send the documents to the requesting computer via the communications medium 240. In other embodiments, the server 230 may include other components to enable the user computer 220 to communicate with the server 230.

5. System Information

In one embodiment, the server 230 runs on a computer that enables the server 230 to communicate with the user computers 220. The computer may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth.

In one embodiment, the processor unit runs the Microsoft® Windows 95 operating system and performs standard operating system functions. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

In one embodiment, the computer is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example NFS v2/v3 over UDP/TCP, Microsoft® CIFS, HTTP 1.0, HTTP. 1.1, DAFS, FTP, and so forth.

D. Communications Medium

Focusing now on the communications medium 240, the presently preferred communication medium 240 includes the Internet made up of routing hubs that comprise domain name system (DNS) servers, as is well known in the art. DNS is a Transfer Control Protocol/Internet protocol (TCP/IP) service translates domain names to and from Internet Protocol (IP) addresses. The routing hubs connect to one or more other routing hubs via high-speed communication links. One popular part of the Internet is the World Wide Web which includes different computers which store electronic web documents via their web sites. The term "site" is not intended to imply a single geographic location, as a Web site or other network site can, for example, include multiple geographically distributed computer systems that are appropriately linked together. Generally, the electronic web documents may display a variety of data such as, graphical images, audio, video, and so forth.

One of ordinary skill in the art will recognize that a wide range of interactive communications mediums may be employed in the present invention. For example, the communications medium 240 may include interactive television networks, telephone networks, wireless networks, wireline networks, cellular networks, wireless data transmission systems, two-way cable systems, customized computer networks, interactive kiosk networks, local area networks, wide area networks, satellite networks, intranet networks, broadband networks, baseband networks, and the like as well as any combination of the above.

IV. Multimedia Client-Server System Processes

As noted above, in some embodiments, the multimedia client-server system 210 includes several user computer processes and server processes.

A. User Computer Processes

The user computer processes in FIG. 3 include the create user account process 312, the set feature access process 314, and the verify user access process 316.

1. Creating a User Account

In one embodiment, the multimedia client program 225 includes a standard account creation process ("create user account process") 312. The create user account process 312 queries the user for a login name and password and may request other information, such as, for example, first name, middle name, last name, language, company name, country, postal code, title, and so forth. The create user account process 312 may utilize a standard HTML form web document to query the user and then use the HTML "POST" command to send the information to the server 230. By using the POST command, the data is sent to the server in a set of body data rather than as part of the URL (as with a GET command). The create user account process 312 then receives an indication from the server 230 that the user's account was successfully created or that there was an error such that the user's account was not created (e.g., password invalid, user name already exists, missing information, etc.).

If the account is successfully created, then the create user account process 314 may present the user with a hyperlink to download the multimedia client program 225. When downloading the multimedia client program 225, the user is typically prompted to select one of several license models or subscription packages to use the multimedia client program 225. The license models or subscription packages are typically of varying degrees. For example, for free, the user may sign up for the Basic Level that gives the user access to few, if any, of the multimedia client program features. For a medium fee, for example, $9.95 per month, the user may sign up for the Silver Level which gives the user accesses to some, but not all, of the multimedia client program features. For a higher fee, for example, $19.95 per month, the user may sign up for the Gold Level which gives the user access to all of the multimedia client program features. It is recognized that the license models listed above are only sample models and that a variety of models may be used. In addition, in some cases the user may be given access to some or all of the features for a limited period of time for promotional reasons, such as to entice the user to sign up for a more comprehensive license.

It is recognized that the create user account process 312 discussed above may be implemented using other embodiments. For example, a variety of information may be gathered from the user, and various protocols may be used to send the information to the server.

2. Setting Feature Access

Figure 5:
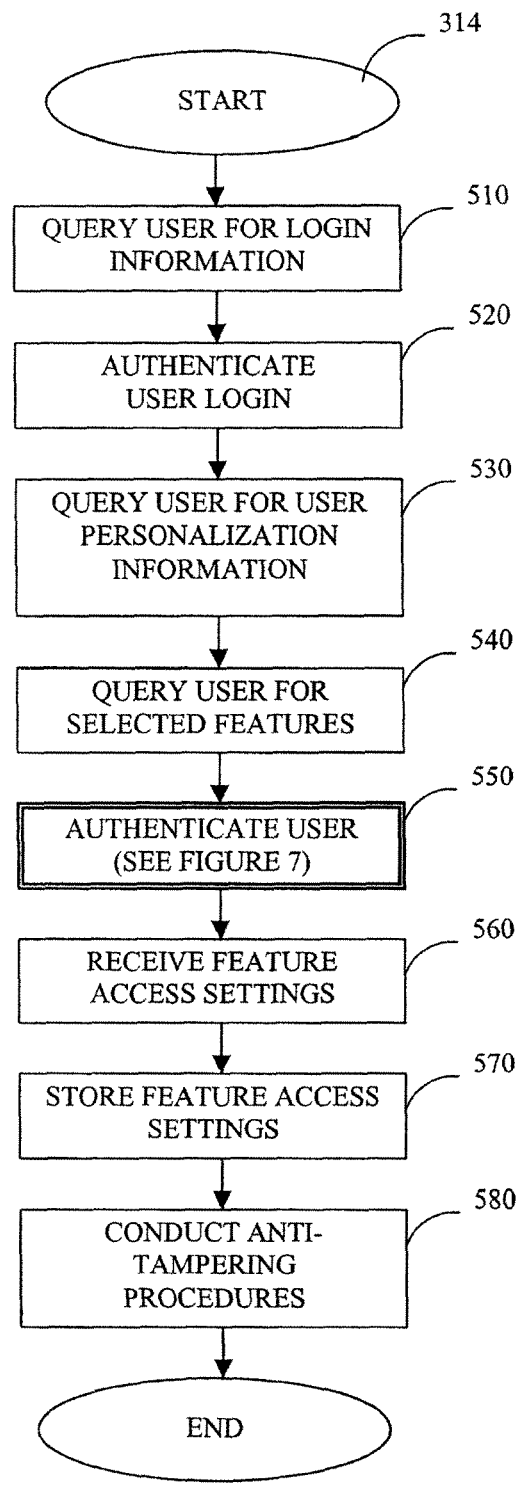
FIG. 5 illustrates a flowchart of one embodiment of a process for setting feature access.

FIG. 5 illustrates one embodiment of a flow chart for setting feature access ("set feature access process") 314. It is recognized that the multimedia client program 225 may include a variety of features and that the set feature access process 314 may be used to control access to a single feature, a group of features, various groups of features, and so forth. In one embodiment, the set feature access process 314 is initiated by the user when the user wants to initialize, update, or change his or her access to features of the multimedia client program.

Beginning at a start state, the set feature access process 314 queries the user of the multimedia client program 225 for login information (block 510). The login information may include typical login information, such as, for example, a login identifier and a corresponding password. It is recognized that in this embodiment, the term query includes presenting the user with a fill-in form via a web document that requests information and receiving the user's submitted information. It is recognized that in other embodiments, the user may be queried using line prompts, voice prompts, and so forth.

Next, the set feature access process 314 authenticates the user's login information (block 520). In one embodiment, to authenticate the user's login information, the login information is sent to the server 230 via an HTTP "POST" command to verify the user's account status. By using the POST command, the data is sent to the server in a set of body data rather than as part of the URL (as with a GET command). A session ID or an error value is received from the server 230. If the user is not valid (e.g., an error value is received), then the set feature access process 314 may send an error message to the user requesting that the user re-submit the login information (not shown) or proceed to an end state thereby terminating the set feature access process 314. User login authentication may fail, for example, if the password was invalid for the login identifier, the user's account is inactive, and/or the login identifier does not exist in the database.

If the user is valid, then the set feature access process 314 queries the user for additional information ("user personalization information") (block 530) such as, for example, language, country/region, zip or postal code, gender, birth year, and so forth. In some embodiments, some of the additional information may be designated as required, such as, for example, the language, country/region, and zip or postal code, while other information may be designated as optional, such as, for example gender and birth year. The user personalization information may also include designation of topics that are of interest to the user, such as, for example, entertainment, sports, news, gardening, and/or music. In other embodiments, the set feature access process 314 may not query the user for personalization information and/or the create user account process 312 may collect such information.

Next, the set feature access process 314 queries the user for a selection of features that the user wishes to enable (block 540). For example, the user may be presented with a list of features in a web document, and then the user may select a subset of the features by marking a checkbox that corresponds to desired features. It is recognized that in other embodiments, the user may have already implicitly selected which features are to be enabled by downloading the multimedia client program 225 and/or by purchasing a licensing model or subscription package. The license model or subscription package typically includes access to a subset of the features of the multimedia client program 225.

The set feature access process 314 then sends the user personalization information and the selection information to the server 230 to authenticate the user (block 550). One embodiment of a process for authenticating a user is discussed below with respect to FIG. 7. The set feature access process 314 may send the information using the HTML POST command. Furthermore, in some embodiments, the set feature access process 314 may also send other information to the server 230, such as, for example, connection speed, multimedia client program name, multimedia client program type, multimedia client program version, IP Address, date, distributor code, OEM code, operating system build number, player language, originator code, and so forth.

In one embodiment, the set feature access client process 314 may validate the information before sending the information to the server 230 (not shown). This validation may include, for example, determining whether the user already has an account such that the user may be offered a different login path, such as, for example, to create an account or to confirm a existing account information.

Next, the set feature access process 314 receives feature access information 332 from the server 230 (block 560). In one embodiment, the feature access information 332 may be received by the multimedia client program 225 using the standard cookie transport mechanism, though it is recognized that a variety of transport protocols may be used, such as, for example, HTTP posts using the GET command, as well as any other secure protocol that enables data to be sent and then received. In some embodiments, the set feature access process 314 may also receive other information from the server 230, such as, for example, multimedia client program cookies, registry setting information for country ID, the user's preferred language, the user's zip/postal code, the user's encrypted user name, as well as web browser cookies with information about the multimedia client, the user, and the user's preferences.

The set feature access process 314 then stores the features access information 332 on the user computer 220 (block 570) as well as other information received from the server 230 in block 560. In one embodiment, the feature access information 332 and/or other information may be stored as cookie files in the cookie database that are accessed by the web browser 320 and the multimedia client program 225. It is recognized, however, that the feature access information 332 and/or other information may be stored in other locations on the user computer 220 that may be accessed by the multimedia client program 225, such as, for example, in a separate database, as a flat file, and so forth.

Proceeding to the next state, the set feature access process 314 may initiate anti-tampering procedures to protect the feature access information 332 (block 580). The anti-tampering procedures may include, for example, recording the date/time the feature access information 332 was last modified, encrypting the feature access information 332, computing the hash value of the feature access information 332 and storing the anti-tampering information in a pre-determined location to be used later to ensure that the feature access information 332 has not been modified. The set feature access process 314 then proceeds to an end state.

As noted above, various anti-tampering procedures may be used, such as, for example, computing the hash value of the feature access information 332. To compute the hash value, the feature access information, which is of a variable length, is converted to a fixed-length output, typically called a hash value. One sample hash function is an XOR of the input or a MOD of the input, though it is recognized that a variety of functions may be used. In addition, other anti-tampering procedures may be used, such as, for example, message authentication codes, symmetric encryption algorithms, asymmetric encryption algorithms, hybrid algorithms, anti-debugging mechanisms, code obfuscation, and so forth. For more information on sample anti-tampering procedures, please refer to "Applied Cryptography" by Bruce Schneier, published by John Wiley & Sons, Inc. 1996, which is hereby incorporated by reference in its entirety.

It is recognized that the set feature access process 314 illustrated in FIG. 5 depicts one embodiment of a set feature access process 314 and that other embodiments may be used. For example, the set feature access process 314 may store additional user information on the user computer 220 after it is received in block 530. In addition, the information may be stored in the user computer's cookie database 330 or in other locations, such as, for example, in a separate database, in a flat file, and so forth. Furthermore, a variety of anti-tampering procedures may be used, such as encryption.

3. Validate User Access

Figure 6:
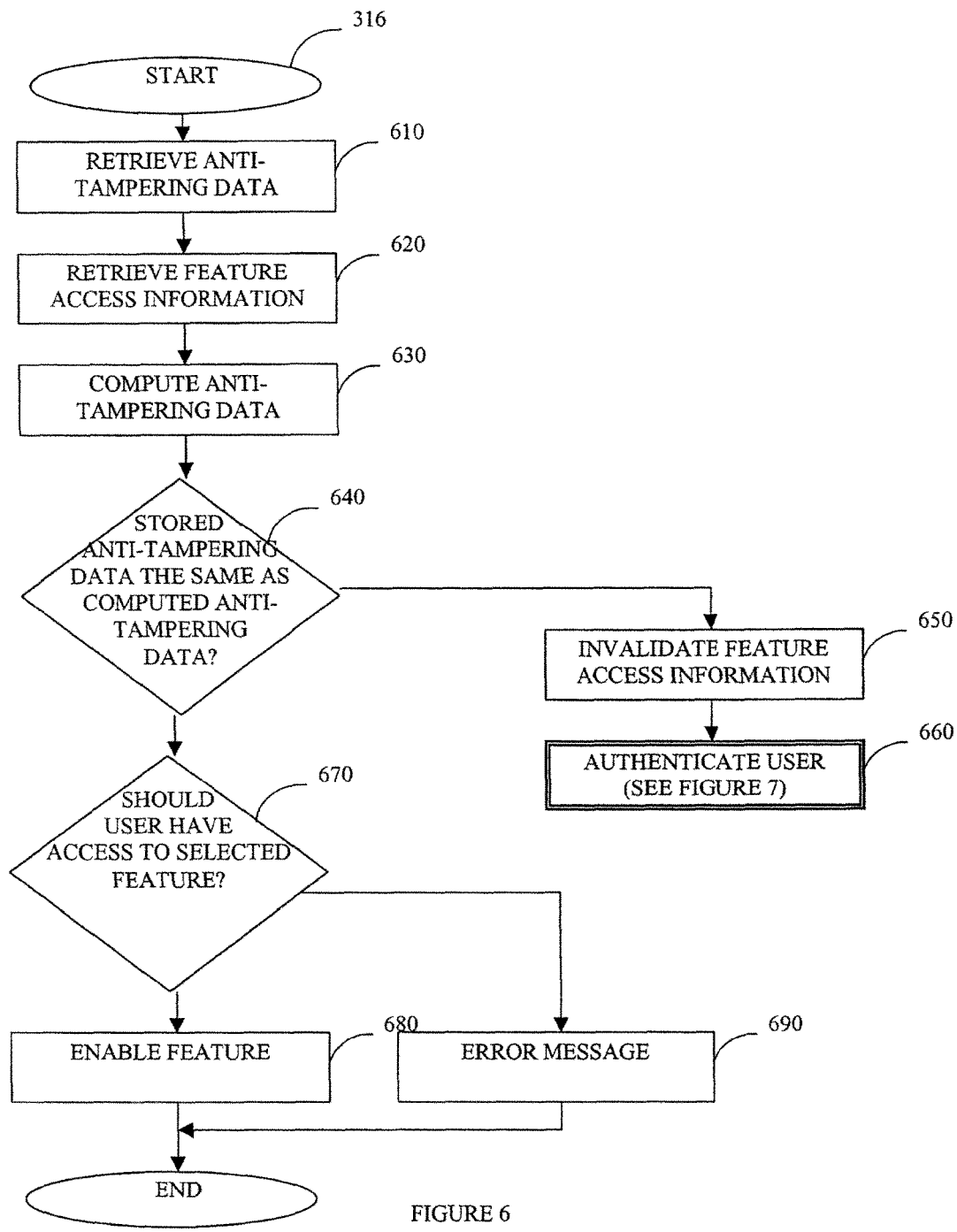
FIG. 6 illustrates a flowchart of one embodiment of a process for validating user access.

FIG. 6 illustrates one embodiment of a process for validating user access ("validate user access process") 316. In one embodiment, the validate user access process 316 is initiated when a user attempts to access or enable one of the features of the multimedia client program 225. In other embodiments, the validate user access process 316 may be initiated on a periodic basis (e.g., once a day, once a week, etc.) and/or every time the user runs the multimedia client program 225.

Beginning at a start state, the validate user access process 316 retrieves the anti-tampering data (block 610). The anti-tampering data may include, for example, the date and time the feature access information 332 was last modified, the hash of the feature access information 332 using the machine ID, and so forth. The anti-tampering data may be stored in one or more predetermined locations on the user computer 220. For example, the anti-tampering data may be stored in a flat file, in an existing file created by the user computer's operating system, and so forth.

The validate user access process 316 then retrieves the feature access information 332 (block 620) from the cookie database 330 and computes the anti-tampering data (block 630). For example, the validate user access process 316 may determine the date and time the feature access information 332 was last modified and compute a hash of the feature access information 332 using the machine ID. The validate user access information process 316 then determines whether the stored anti-tampering data is the same as the computed anti-tampering data (block 640).

If the information is different, indicating that the information may have been compromised, then the validate user access process 316 invalidates the feature access information 332 (block 650), such as setting all of the features to be disabled or expired, and then contacts the server 230 to authenticate the user (block 660). One embodiment of authenticating a user is discussed below with respect to FIG. 7. It is recognized that the information may be compromised for a variety of reasons such as, for example, if the information has been changed, if the executing computer is changed, if the system has indicated that the information is tainted (e.g., invalid credit card, login failure, credit card expiration, etc.), and so forth.

If the information is the same, then the validate user access process 316 determines whether the user should have access to the selected feature (block 670). For example, the validate user access process 316 may look in the feature access information 332 to determine whether the selected feature is set as enabled and/or whether the expiration date of the selected feature has expired. If the user should have access to the selected feature, the validate user access process 316 enables the feature (block 680) and proceeds to an end state. If not, then the validate user access process 316 sends the user an error message (block 690) and may send the user information on how to gain access to the feature, such as, for example, paying a fee of $2.95 per month.

It is recognized that FIG. 6 illustrates one embodiment of a validate user access process 316 and that other embodiments may be used. In other embodiments, the validate user access process 316 may also include presenting the user with information if a feature is set to expire within a window of time, such as, for example, within ten days. In addition, the feature access information 332 may be stored using a variety of anti-tampering techniques. For example, in other embodiments, the feature access information 332 may be encrypted.

B. Server Processes

The server processes in FIG. 4 include the create user account process 412, the authenticate user process 414, and the update rules process 416.

1. Creating a User Account

The create user account process 412 receives user information from a requesting user computer 220. The information may include, for example, login name, password, first name, middle name, last name, language, company name, country, postal code, title, and forth. The create user account process 412 then verifies that the login name is unique and that the password is valid, and creates a record in the user database 430. The create user account process 412 may then send a message to the requesting user computer 220 that indicates whether the user account was successfully created or whether there was an error such that the user account was not created, such as, for example, if the password is invalid, the user name already exists, there is missing information, and so forth. In some embodiments, the create user account process 412 may also store payment information, such as, for example, credit card number, billing address, and expiration date.

2. Authenticating a User

Figure 7:
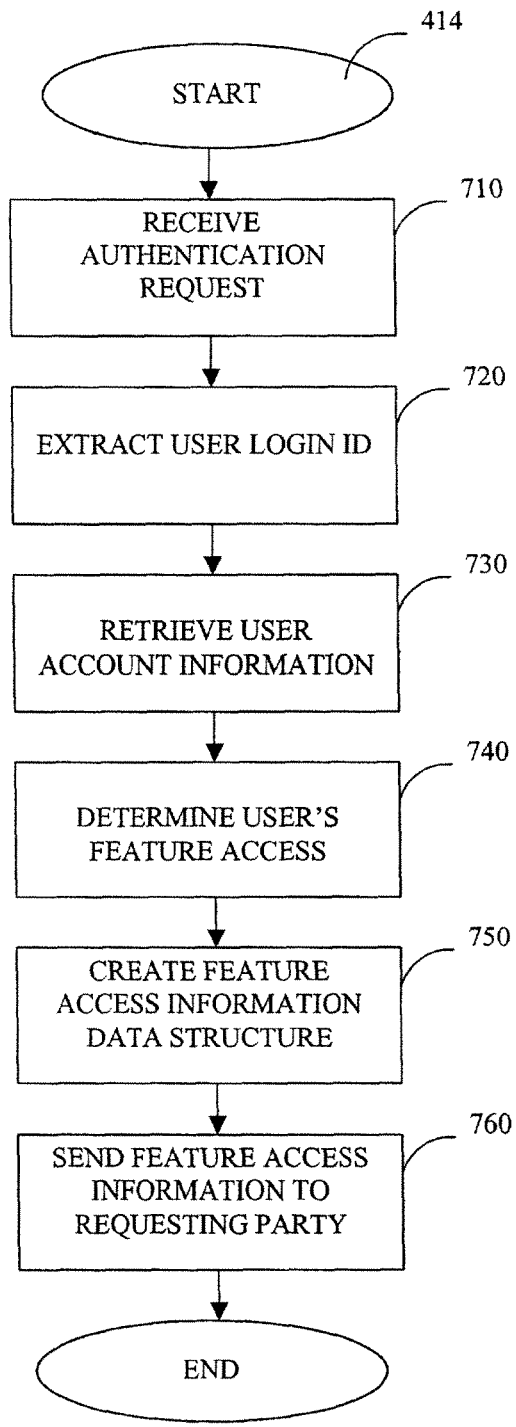
FIG. 7 illustrates a flowchart of one embodiment of a process for reauthorizing feature access.

FIG. 7 illustrates one embodiment of a process for authenticating a user ("authenticate user process") 414. In one embodiment, the authenticate user process 414 is initiated when the server receives a request from a multimedia client program 225 that has determined that the feature access information 332 has been compromised, such as, for example, the feature access information 332 has been modified or replaced by an unauthorized party. The authenticate user process 414 may also be initiated by the multimedia client program 225 when the user's feature access information 332 expires. For example, the server may include in the feature access information 332, a date at which the information becomes stale, thereby indicating that the multimedia client program 225 should initiate the authenticate user process 414. Thus, in one embodiment, the multimedia client program 225 checks to see if the feature access information 332 is stale when the user runs the multimedia client program 225. In addition, the authenticate user process 414 may be initiated when the user accesses multimedia content data on the server 230, when the user accesses the server 230 to update account information, and/or, on a periodic basis, such as, for example, once a day, once a week, once a month, and so forth. Furthermore, the authenticate user process 414 may be initiated when the user accesses a web site related to the server 230 such as, for example, to obtain multimedia content, when the user downloads plug-ins to the multimedia client program 225, when the user has not logged into the server 230 for X amount of time, where X is a predetermined value or set as the date when the user should login ("reauthentication date"), and so forth. In one embodiment, for example, X may be 30 days or set to Apr. 15, 2002.

Beginning at a start state, the authenticate user process 414 proceeds to the next state and receives a request from the multimedia client program 225 to authenticate a user (block 710). In some instances, the user is required to "login" by submitting a login ID and a password. For example the user may be requested to "login" if the user has not logged in for X amount of time, where X is a predetermined value or a predetermined date, such as, for example, 10 days, 30 days, 60 days, and/or a specific date. In other situations, the login information may be sent from the user's multimedia cookie without action by the user, such as, for example, if the user's feature access information and/or multimedia client program information has become stale. The authenticate user process 414 then extracts the user's login identifier from the request (block 720) and retrieves the user's account information from the user database 430 using the login identifier (block 730). The authenticate user process 414 then uses the rules database 420 and the user's account information to determine which features, if any, that the user should have access to (block 740). Next, the authenticate user process 414 creates a data structure with the user's feature access information 312 (block 750) and sends the feature access information 332 to the requesting multimedia client program 225 (block 760). In one embodiment, the authenticate user process 414 sends the feature access information 332 to the multimedia client program 225 as a cookie file using the standard cookie transport mechanism, though it is recognized that a variety of transport protocols may be used as discussed above. Furthermore, in other embodiments, the authenticate user process 414 may use other unique IDs to identify the user.

It is recognized that the authenticate user process 414 illustrated in FIG. 7 represents one embodiment of the authenticate user process 414 and that other embodiments may be used. For example, other identifiers may be used to identify the user, and a variety of data structures may be used to store the feature access information. Furthermore, a variety of feature access information may be created for the user.

3. Updating License Rules

The server 230 also includes a process for updating the rules ("update rules process") 416. The update rules process 416 receives new rules to add to the rules database 420 and store, modify, and/or delete rules in the rules database 420. The rules, as discussed above, may detail which features are to be enabled for particular groups of users, and/or they may also identify the window of time for which the features should be enabled.

V. Sample Feature Access Information

FIG. 8 illustrates one embodiment of the feature access information 332 illustrated in FIG. 3. The exemplary feature access information 332 includes information about the multimedia client program 225, the user, feature access information, and content access information. The cookie value for each feature is stored as:

Feature_Name=ON_OFF|Expire|Days_To_Warn

In the example feature cookie entry, Feature_Name is the name of the cookie feature. The ON_OFF value signifies whether the feature should be enabled or disabled. If the feature is to be enabled, the ON_OFF value is 1; if the feature is to be disabled, the ON_OFF value is 0. The Expire value signifies the expiration date, represented as YYYYM-MDD, where YYYY is the year, MM is the month, and DD is the day. The Days_To_Warn value signifies the number of days before the expiration date in which the user should be warned that the feature is to expire soon.

For example, the following is one sample feature cookie entry 810 in FIG. 8.

Feature_A=1|20020305|5

Thus, Feature A is enabled and set to expire on Mar. 5, 2002. In addition, the multimedia client program 225 will warn the user five (5) days before Feature A is going to expire.

The exemplary feature access information 332 is stored in the standard cookie format, though, as discussed above, it is recognized that the feature access information 332 may be stored in a variety of formats and stored in a variety of locations. Furthermore, various types of information may be included in the feature access information and/or the information may be represented in different forms. For example, the expiration date may be represented in YYMMDD, where YY is the year, MM is the month, and DD is the day. In addition, dates/times may be represented using epoch time, in which the value for Mar. 5, 2002 at noon is represented as 1015329600. Epoch time is the basis of date and time calculation on most computers and is represented as the amount of time that has elapsed since 1 Jan. 1970 00:00:00. Epoch time is usually expressed in seconds, but many browsers use milliseconds.

FIG. 8 also includes a set of multimedia client program information 820 which may be used by the multimedia client program 225 to customize the multimedia client program interface 110 and/or to validate or initiate authentication of the user. The sample multimedia client program information 820 includes: cookie version, encrypted email address, user id, subscription service name, subscription service status, subscription service expiration date, content subscription item, content subscription expiration date, language code, postal code, country code, the date the cookie becomes stale, the date the user should be reauthenticated, the user's birth year, the user's gender, and the hash value of a portion of the multimedia client program information 820.

While one set of multimedia client program information 820 is shown in FIG. 8, it is recognized that a variety of multimedia client program information 820 may be used and/or different information may be stored. Further, while the exemplary multimedia client program information 820 is stored in cookie format, it is recognized that other formats may be used to store the multimedia client program information 820.

V. Sample Operation

A sample operation of one embodiment of the systems and methods will now be described, though it is recognized that the sample operation illustrates only an example implementation of the systems and methods and that other implementations may be used.

Company is offering for download an audio player with Feature A, Feature B, and Feature C, such as, for example, Graphic Equalizer, Video Controls, and Theater Mode. Further, Company offers three subscription packages.

Gold:
Unlimited streaming
150 downloads per month
Features A, B, and C
$20.00 per month
Silver:
100 streams
50 downloads per month
Features A and B
$10.00 per month
Bronze:
50 streams
15 downloads per month
Feature A
$5.00 per month Users can sign-up for a subscription package, download the audio player, and utilize the program to listen to audio files.

User Chad has decided to sign up for the Silver package and logs on to Company's web site. Chad creates a login/password, selects the Silver package, submits his credit card information, and downloads the audio player. Chad also submits additional information such as his preference for English, that he is a male, he is in the 25-30 age category, and he likes acoustic guitar music.

Company's server takes Chad's information, including his request for the Silver package, and creates a feature access cookie for user Chad which enables Features A and B for thirty (30) days. Furthermore, because Company is promoting its Gold package, the feature access cookie also enables Feature C for a trial period of five (5) days. The server sends the feature access cookie to Chad's computer.

When Chad uses the audio player, the audio player accesses the feature access cookie to determine that the feature access cookie is not stale, that user Chad has logged into the server within the last thirty (30) days, and that Chad has access to Features A, B, and C. After five days, however, Chad's access to Feature C expires, and when Chad attempts to use Feature C, the audio player checks his feature access cookie and denies him access to Feature C.

Next, Chad decides to contact Company's web site to download an audio file. Chad's feature access cookie is transmitted as part of the HTTP request to the web site. While Chad is in the process of downloading the audio file, the server reads his feature access cookie to recognize the user as Chad, looks up Chad's account information, determines that Features A and B are to expire in ten (10) days and that Feature C has expired. Because Chad has paid for his subscription for the next month and his last credit card charge was authorized, the server updates the expiration date of Features A and B to expire in thirty (30) days.

In addition, Company is offering a new Feature D as a plug-in to the audio player. The server queries Chad to see if he wants to download the plug-in for free. Chad accepts and downloads the plug-in. The server then adds to Chad's feature access cookie that Feature D is to be enabled for ten (10) days. The server then sends the updated feature access cookie to Chad's computer which stores the new feature access cookie.

Chad's computer may then integrate the plug-in with his audio player and when Chad runs the audio player and accesses Feature D, the audio player checks his feature access cookie and gives Chad access to Feature D.

VI. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A client computer system capable of communicating with a remote server computer system via a network, the client computer system comprising:
    computer-readable memory storing instructions that are capable of being executed by the client computer system, the instructions when executed by the client computer system resulting in the client computer system being capable of requesting provision of at least one subscription-based gaming service, the provision to be based upon at least one subscription status that is associated, at least in part, with a subscription that is capable of being established via at least one user account that is capable of being created, at least in part, using the client computer system;
    the at least one subscription-based gaming service being associated with at least one game capable of being provided, at least in part, via the network, to the client computer system, the game being associated, at least in part, with at least one game application that is capable of being provided, at least in part, via download to the client computer system;
    the subscription being associated with a relatively higher subscription level relative to a relatively lower subscription level, the relatively higher subscription level being associated with relatively more features relative to relatively fewer features associated with the relatively lower subscription level, the relatively higher subscription level being associated with a relatively higher subscription fee relative to a relatively lower subscription fee associated with the relatively lower subscription level;

wherein:

the client computer system is capable, when the client computer system is in operation, of requesting provision, from the remote server computer system via the network, of at least one subscription-based unlimited music streaming and audio file download service to be provided to the client computer system for playing via at least one downloadable media application;

the client computer system is capable, when the client computer system is in the operation, of requesting the provision of the at least one subscription-based gaming service from the remote server computer system via the network;

the client computer system is capable of periodically updating user access control-related data stored at the client computer system based upon updated user access control-related data to be periodically received from the remote server computer system via the network so as to dynamically control user access to streaming media content that is capable of being provided to the client computer system from the remote server computer system.

2. The client computer system of claim 1, wherein:
the relatively lower subscription fee is free.

3. The client computer system of claim 1, wherein:
the network comprises an Ethernet protocol network.

4. The client computer system of claim 1, wherein:
the relatively higher subscription level is a Gold subscription.

5. The client computer system of claim 1, wherein:
the client computer system comprises at least one processor to execute at least one Microsoft Windows operating system.

6. The client computer system of claim 1, wherein:
the subscription is a trial subscription.

7. At least one non-transitory computer-readable medium storing instructions that when executed by a client computer system result in the client computer system performing operations comprising:

requesting provision of at least one subscription-based gaming service, the provision to be based upon at least one subscription status that is associated, at least in part, with a subscription that is capable of being established via at least one user account that is capable of being created, at least in part, using the client computer system;

the at least one subscription-based gaming service being associated with at least one game capable of being provided, at least in part, via a network, to the client computer system, the game being associated, at least in part, with a game application that is capable of being provided, at least in part, via download to the client computer system;

the subscription being associated with a relatively higher subscription level relative to a relatively lower subscription level, the relatively higher subscription level being associated with relatively more features relative to relatively fewer features associated with the relatively lower subscription level, the relatively higher subscription level being associated with a relatively higher subscription fee relative to a relatively lower subscription fee associated with the relatively lower subscription level;

wherein:

the client computer system is capable, when the client computer system is in operation, of requesting provision, from the remote server computer system via the network, of at least one subscription-based unlimited music streaming and audio file download service to be provided to the client computer system for playing via at least one downloadable media application;

the client computer system is capable, when the client computer system is in the operation, of requesting the provision of the at least one subscription-based gaming service from the remote server computer system via the network;

the client computer system is capable of periodically updating user access control-related data stored at the client computer system based upon updated user access control-related data to be periodically received from the remote server computer system via the network so as to dynamically control user access to streaming media content that is capable of being provided to the client computer system from the remote server computer system.

8. The at least one computer-readable medium of claim 7, wherein:
the relatively lower subscription fee is free.

9. The at least one computer-readable medium of claim 7, wherein:
the network comprises an Ethernet protocol network.

10. The at least one computer-readable medium of claim 7, wherein:
the relatively higher subscription level is a Gold subscription.

11. The at least one computer-readable medium of claim 7, wherein:
the client computer system comprises at least one processor to execute at least one Microsoft Windows operating system.

12. The at least one computer-readable medium of claim 7, wherein:
the subscription is a trial subscription.

* * * * *